(12) United States Patent
Cassetti et al.

(10) Patent No.: US 11,746,940 B2
(45) Date of Patent: Sep. 5, 2023

(54) PIPELINE TELESCOPIC JOINT

(71) Applicant: SAIPEM S.P.A., San Donato Milanese (IT)

(72) Inventors: Marcello Cassetti, San Donato Milanese (IT); Carlo Canali, San Donato Milanese (IT)

(73) Assignee: SAIPEM S.P.A., San Donato Milanese (IT)

( * ) Notice: Subject to any disclaimer, the term of this patent is extended or adjusted under 35 U.S.C. 154(b) by 72 days.

(21) Appl. No.: 17/439,686

(22) PCT Filed: Mar. 18, 2020

(86) PCT No.: PCT/IB2020/052471
§ 371 (c)(1),
(2) Date: Sep. 15, 2021

(87) PCT Pub. No.: WO2020/188500
PCT Pub. Date: Sep. 24, 2020

(65) Prior Publication Data
US 2022/0163150 A1    May 26, 2022

(30) Foreign Application Priority Data

Mar. 19, 2019  (IT) .................... 102019000003995

(51) Int. Cl.
*F16L 27/12*  (2006.01)
(52) U.S. Cl.
CPC .............................. *F16L 27/12751* (2019.08)
(58) Field of Classification Search
CPC ..... F16L 27/12; F16L 27/127; F16L 27/1275; F16L 27/12751

(Continued)

(56) References Cited

U.S. PATENT DOCUMENTS

| 381,803 | A | * | 4/1888 | Marquis | ................. | F16L 27/12 |
| | | | | | | 285/302 |
| 382,514 | A | * | 5/1888 | Davis | ....................... | F16L 27/12 |
| | | | | | | 285/23 |

(Continued)

FOREIGN PATENT DOCUMENTS

| CN | 101 975 317 A | 2/2011 |
| DE | 40 12 983 A1 | 12/1990 |

(Continued)

OTHER PUBLICATIONS

Notification Concerning Submission, Obtention or Transmittal of Priority Document for International Application No. PCT/IB2020/052471 dated Jun. 12, 2020.

(Continued)

*Primary Examiner* — David Bochna
(74) *Attorney, Agent, or Firm* — Neal, Gerber & Eisenberg LLP (57) ABSTRACT

A pipeline telescopic joint configured to compensate for dimensional changes has: a first pipe section having a first diameter; a second pipe section having a second diameter smaller than the first diameter is slidingly coupled to the first pipe section; an end assembly, which is fixed to the second pipe section an annular seat bounded by two facing cylindrical faces; and an annular gasket, which is housed within the annular seat and has a polymeric casing and a spring housed within the polymeric casing, wherein the polymeric casing is in contact with the cylindrical faces.

18 Claims, 7 Drawing Sheets

(58) Field of Classification Search
USPC .................................................. 285/301, 302
See application file for complete search history.

(56) References Cited

U.S. PATENT DOCUMENTS

| | | | | |
|---|---|---|---|---|
| 853,974 | A | * | 5/1907 | Hayden .................. F16L 27/12 285/302 |
| 2,520,501 | A | | 8/1950 | Guiler et al. |
| 2,538,683 | A | | 1/1951 | Guiler et al. |
| 3,512,789 | A | | 5/1970 | Tanner |
| 3,680,874 | A | * | 8/1972 | Schwarz ............... F16L 27/127 277/618 |
| 3,951,418 | A | | 4/1976 | Dryer |
| 4,030,740 | A | * | 6/1977 | Kniss, Jr. ................ F16L 27/12 285/302 |
| 6,003,814 | A | * | 12/1999 | Pike ....................... B64D 15/04 285/302 |
| 6,131,960 | A | | 10/2000 | McHughs |
| 6,449,942 | B1 | * | 9/2002 | Dean ....................... F16L 27/12 285/302 |
| 10,948,113 | B1 | * | 3/2021 | Robertson ......... F16L 27/12751 |
| 2014/0053725 | A1 | * | 2/2014 | Allen ...................... B01D 63/00 96/6 |
| 2014/0361532 | A1 | * | 12/2014 | Gauss ..................... F16L 27/12 285/145.5 |
| 2015/0345682 | A1 | * | 12/2015 | Fraysse ................... F16L 27/12 285/418 |

FOREIGN PATENT DOCUMENTS

| | | | | |
|---|---|---|---|---|
| EP | 0 390 418 | A | | 10/1990 |
| FR | 2105912 | | | 4/1972 |
| JP | 09178071 | A | * | 7/1997 ............. F16L 27/12 |
| JP | 2002250204 | A | * | 9/2002 ............. F16L 27/12 |
| JP | 2004 347045 | A | | 12/2004 |
| WO | WO 96/16289 | A1 | | 5/1996 |
| WO | WO 2017/201565 | A1 | | 11/2017 |

OTHER PUBLICATIONS

International Search Report and Written Opinion for International Application No. PCT/IB2020/052471 dated Jul. 6, 2020.
Italian Priority Search Report for Italian Application No. IT 201900003995 dated Nov. 13, 2019.
PCT Direct Letter attached to the International Patent Application claiming the priority of patent application No. 102019000003995 dated Mar. 13, 2020.

* cited by examiner

PIPELINE TELESCOPIC JOINT

PRIORITY CLAIM

This application is a national stage application of PCT/IB2020/052471, filed on Mar. 18, 2020, which claims the benefit of and priority to Italian Patent Application No. 102019000003995, filed on Mar. 19, 2019, the entire contents of which are each incorporated by reference herein.

TECHNICAL FIELD

The present disclosure relates to a pipeline telescopic joint configured to compensate for dimensional changes.

BACKGROUND

The present disclosure relates to a telescopic joint for pipes connecting the shore to a gas tanker carrying a cryogenic fluid in the liquid state, without thereby losing its generality.

Generally, transportation of a cryogenic fluid takes place inside tanks of gas tankers, which must remain at a certain distance from the shore, even during the cryogenic fluid transfer operations. For this reason, the transfer of the cryogenic fluid takes place through a pipeline connecting the gas tanker to the shore and arranged along a pier. The pipeline comprises straight sections and joints, each of which is arranged between two straight sections.

In practice, bellows expansion joints are generally used.

As is known, during the transfer operations, the cryogenic fluid flows through the pipeline causing its contraction. In general, changes in the temperature of the pipeline bring about changes in the length of the pipeline and stress the joints both mechanically and thermally such as to cause damage or breakage of the joints over time, resulting in leakage of the cryogenic fluid.

Telescopic joints used for pipelines are also known, such as for example the telescopic joint described in PCT Patent Application No. WO 2017/201565, which exhibits a particularly complex sealing system. In this case, the weakness of telescopic joints is the hydraulic seal.

Expansion loops are used to absorb the thermal contractions of the cryogenic pipeline as an alternative to joints, the former comprising pipes and curves which have the disadvantage of being relatively very bulky. Furthermore, expansion loops have relatively high installation costs for civil and/or marine works and at the same time relatively high pressure and refrigeration losses.

SUMMARY

The object of the present disclosure is to provide a pipeline joint which mitigates the drawbacks of the prior art.

In accordance with the present disclosure, there is provided a pipeline telescopic joint configured to compensate for dimensional changes, the telescopic joint comprising:
  a first pipe section having a first diameter;
  at least a second pipe section having a second diameter smaller than the first diameter, arranged at least partly within the first pipe section, and slidingly coupled to the first pipe section;
  at least one end assembly, which is fixed to one between the first and the second pipe section and is configured to define together with the other one between the first and the second pipe section at least one first annular seat bounded by two facing cylindrical faces, wherein one of the cylindrical faces is the cylindrical face of one between the first and the second pipe section; and
  at least one annular gasket, which is housed within the annular seat and comprises a polymeric casing and a spring housed within the polymeric casing, wherein the polymeric casing is in contact with the said cylindrical faces, and the end assembly comprises a ring welded to one between the first and the second pipe section, and at least one annular wall fixed in a releasable way to one end of the ring to bound the annular seat together with the facing cylindrical faces of the ring and of one between the first and the second pipe section.

In accordance with the present disclosure, the telescopic joint ensures a reliable seal for a fluid conveyed inside the pipeline by a relatively simple, non-bulky solution.

In particular, the telescopic joint enables relative telescopic movement of the pipe sections caused by temperature changes during the fluid transfer operations, thus preventing the fluid from leaking.

Leakage of the fluid is prevented by the annular gasket, which is housed in the annular seat and adheres to the cylindrical faces bounding the annular seat.

The relative simplicity of the architecture and the reliability of the telescopic joint reduce the time and costs of designing, installing and maintaining the pipeline. This configuration defines an annular seat that is relatively easily accessible thanks to the releasable connection between the annular wall and the ring, which facilitates maintenance or replacement of the annular gasket.

In particular, in accordance with certain embodiments, the end assembly is fixed to the second pipe section and comprises an annular wall; the ring comprising a shoulder which has a face facing the annular wall and bounds the annular seat together with the annular wall and the facing cylindrical faces of the ring and of the first pipe section. In this way, the annular gasket is held by the shoulder. In other words, the shoulder provides an abutment surface for the annular gasket.

According to certain embodiments, the telescopic joint comprises at least one stroke block fixed in a releasable manner to a portion of the first pipe section arranged around the second pipe section. In this way, the at least one stroke block prevents the first and second pipe sections from slipping off of each other, stopping the telescopic sliding of the second pipe section inside the first pipe section.

In addition, the at least one stroke block has the function of keeping the first pipe section coaxial with the second pipe section.

In particular, in accordance with certain embodiments, the at least one stroke block comprises at least one fastener passing through the thickness of the first pipe section. In this way, the installation of the at least one stroke block is carried out by inserting the at least one fastener into the first pipe section. In greater detail, the at least one stroke block consists of at least one screw screwed inside a respective threaded hole obtained in the first pipe section. Furthermore, in this configuration, the removal of the at least one stroke block to enable assembly and/or maintenance of the joint is relatively simple and quick.

In accordance with a further embodiment, the at least one stroke block comprises a seal ring fixed in a releasable manner to one end of the first pipe section arranged around the second pipe section. In this way, the first pipe section does not have holes passing through its thickness.

According to certain embodiments, the telescopic joint comprises an annular support and a third pipe section fixed to the second pipe section by the annular support and having a third diameter greater than the first and second diameters, wherein the end assembly is fixed to the first pipe section and comprises a first annular wall, which bounds a first annular seat together with the ring and the cylindrical face of the second pipe section, and a second annular wall, which bounds a second annular seat together with the ring and a cylindrical face of the third pipe section. In this way, it is possible to easily arrange two annular gaskets at the sliding surfaces.

According to certain embodiments, the annular support comprises at least one first through-hole. In this way, the at least one first through-hole enables air to be vented from the interspace between the second and the third pipe section, in order to prevent the formation of overpressure or negative pressure within the interspace between the second and the third pipe section during contraction or expansion of the joint.

In particular, the telescopic joint comprises a stroke block fixed to the third pipe section and arranged around the first pipe section. In this way, the stroke block prevents the first and second pipe sections from slipping off of each other, stopping the telescopic sliding of the second pipe section inside the first pipe section.

In particular, the stroke block comprises a third annular wall fixed in a releasable manner to the end portion of the stroke block; the third annular wall bounding a third annular seat together with the end portion of the stroke block and a cylindrical face of the first pipe section. In this way, it is possible to arrange an annular gasket in the sliding area of the stroke block.

According to certain embodiments, the first pipe section comprises at least one second through-hole; the axis of the at least one second through-hole intersecting the third pipe section. In this way, the fluid can flow inside the cylindrical crown bounded by the stroke block, the ring, the first pipe section and the third pipe section. In this configuration, the pressure acting on the face of the ring facing the stroke block balances the totality of the axial force of the pressurized cryogenic fluid acting on the axial supports fixed to the pipeline.

According to certain embodiments, the square of the third diameter D3 is substantially equal to twice the square of the second diameter D2. In other words, the second diameter and the third diameter are related by the relation:

$$D3^2 = 2*D2^2$$

During the operations for transfer of the cryogenic fluid from the gas tanker to, for example, a tank, the pressurized fluid exerts a force on the pipeline section fixed to the tank, which tends to lengthen the pipeline and is related to the pressure of the cryogenic fluid and to the cross-section of the pipeline. When the second and the third diameter of the respective second and third pipeline sections are related by the relation $D3^2 = 2*D2^2$, the force exerted by the cryogenic fluid on the pipeline section fixed to the tank is compensated by the force exerted by the cryogenic fluid on the stroke block. In this way, the pipeline supports can be slidingly connected to the pipeline so as to enable movement of the supports relative to the pipeline. In other words, the forces due to the pressure of the cryogenic fluid, which are discharged onto the axial supports of the pipeline, are substantially zero, enabling the supports to be movable along the direction of extension of the pipeline to enable any displacements caused by the temperature changes.

According to certain embodiments, the telescopic joint comprises two second pipe sections and two end assemblies; wherein the first pipe section extends in the longitudinal direction over a certain length, and the second pipe sections and the end assemblies extend in directions opposite to each other. In this way, the telescopic joint can be installed relatively quickly and easily.

In particular, the telescopic joint comprises two stroke blocks, each of which is fixed in a releasable manner to a respective portion of the first pipe section arranged around the respective second pipe section. In this way, the stroke block prevents the first and the two second pipe sections from slipping off of each other, stopping the telescopic sliding of the two second pipe sections inside the first pipe section.

In particular, in accordance with certain embodiments, each stroke block comprises fasteners passing through the thickness of the first pipe section. In this way, the fasteners, in addition to acting as stroke blocks, ensure that the first and the second pipe sections are coaxial with each other.

According to certain embodiments, the end assembly is fixed to the first pipe section and comprises a ring and an annular element, which is fixed in a releasable manner to the ring and comprises an annular wall; the ring bounding the annular seat together with the external cylindrical face of the pipe section, and the annular wall. In this way, the telescopic joint is relatively simple and inexpensive to manufacture and assemble.

In particular, the ring is provided with at least one through-opening so as to enable the pressure inside the annular seat to be measured. In this way, it is possible to continuously monitor the correct operation of the telescopic joint and detect any fluid leaks.

In particular, the measurement of the pressure inside the annular seat is carried out using pressure gauges positioned at the at least one opening.

In particular, the end assembly comprises a plurality of tie rods, each of which is fixed to the annular element and is provided with a stroke block; the telescopic joint comprising at least one ring fixed to the second pipe section and provided with through-openings, in which the tie rods are slidingly inserted, so as to limit the sliding of the second pipe section relative to the first pipe section. In this way, the second pipe section can be prevented from slipping completely off of the first pipe section.

In particular, the telescopic joint comprises a sealing assembly, which is housed in the annular seat and comprises a plurality of annular gaskets and at least one spacer arranged between two annular gaskets, so as to ensure reliable fluid sealing and, at the same time, enable pressure measurement at the at least one spacer.

In accordance with a variant of the present disclosure, the end assembly is fixed to the first pipe section and comprises a ring; an annular element screwed to the ring; a stroke block; and a fourth pipe section, which is arranged around the second pipe section and is fixed to the annular element and the stroke block, so as to protect the telescopic joint from external agents. In other words, the annular element, the fourth pipe section and the stroke block form a protective casing, which separates the portion of the second pipe section from the external environment, which portion, in use, slides relative to the respective sealing assembly.

In particular, the telescopic joint comprises a sealing assembly, which is housed in the annular seat and comprises at least one annular gasket and a ring provided with an annular wall held by the annular element in contact with one end of the first pipe section, so as to bound the annular seat.

According to certain embodiments, the facing cylindrical faces bounding the at least one first annular seat have a surface roughness of less than 0.9 in particular less than 0.3 μm.

In this way, the annular gasket can adhere to the contact surfaces within the annular seat, thus preventing the leakage of the cryogenic fluid.

BRIEF DESCRIPTION OF THE FIGURES

Further features and advantages of the present disclosure will be apparent from the following description of non-limiting embodiments thereof, with reference to the attached figures, wherein.

DETAILED DESCRIPTION

Figure 1:
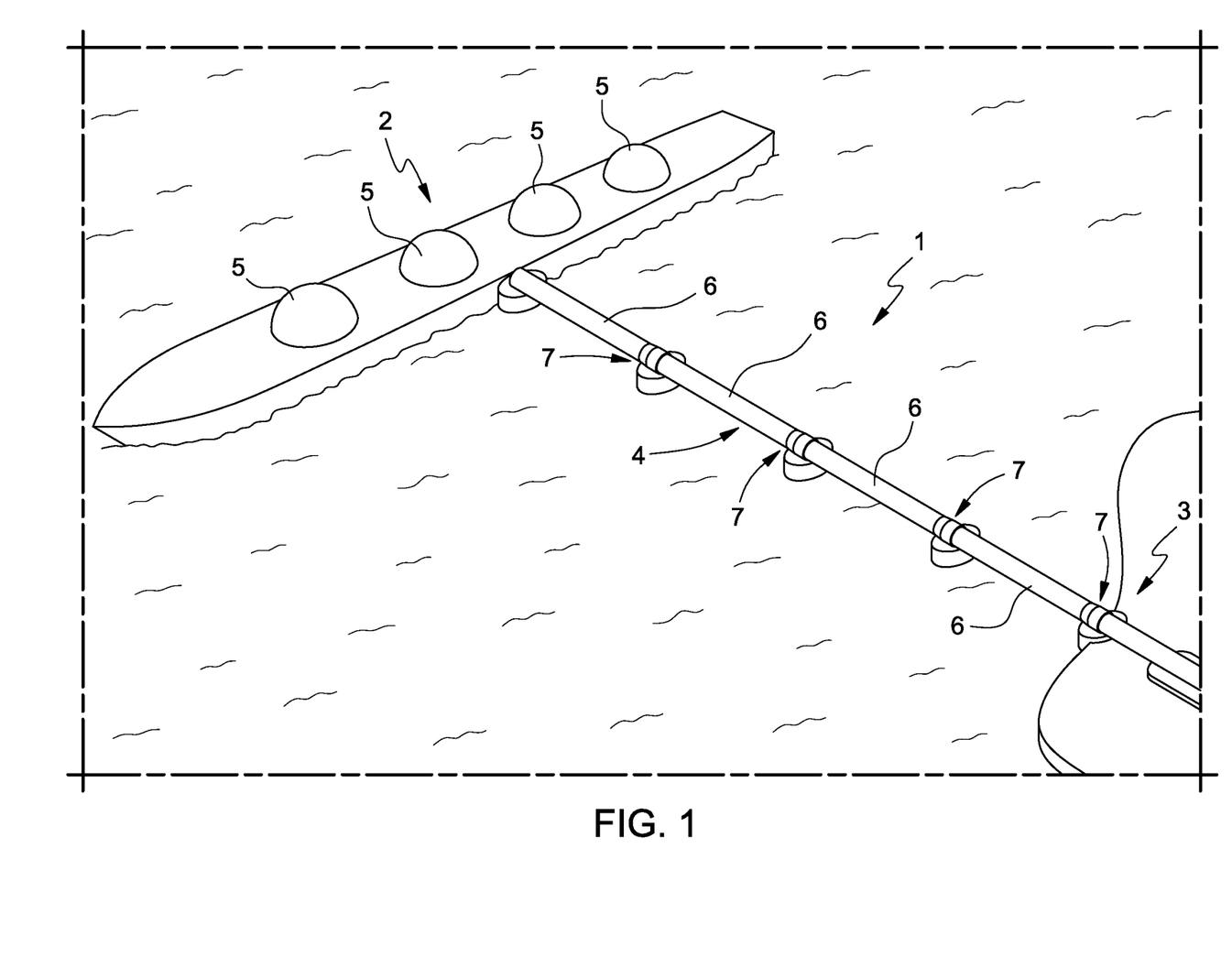
FIG. 1 is a perspective view, with parts removed for clarity, of a cryogenic fluid transfer system.

With reference to FIG. 1, number 1 indicates, as a whole, a system configured to transfer a cryogenic fluid, such as a low-temperature, high-pressure liquefied gas. According to the present disclosure, the transfer system 1 extends between a gas tanker 2 and the shore 3 and comprises a pipeline 4 connecting the gas tanker 2 to the shore 3 and inside which the cryogenic fluid flows.

The gas tanker 2 comprises a plurality of sphere-shaped tanks 5 configured to store the cryogenic fluid, and during the cryogenic fluid transfer operations is positioned at a distance from the shore 3.

The pipeline 4 comprises a plurality of pipes 6 connected to each other by a plurality of telescopic joints 7.

Figure 2:
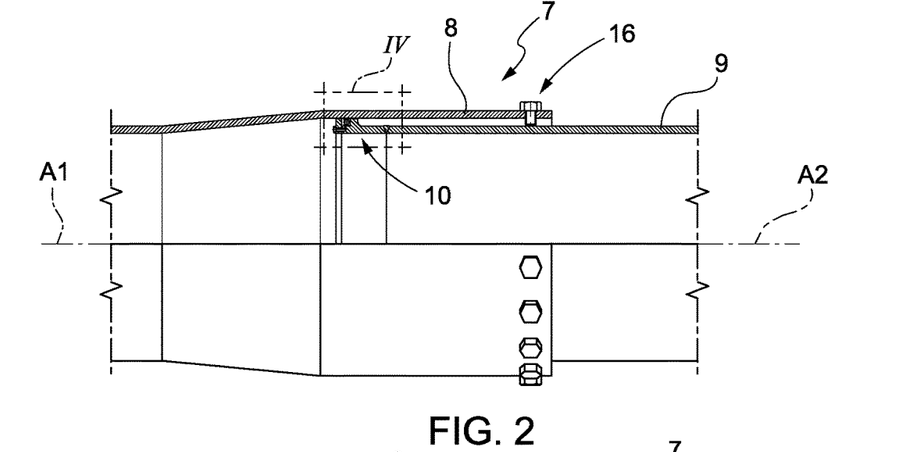
FIGS. 2 and 3 are side elevation views, with parts removed for clarity and parts in section, of a pipeline joint of the transfer system of FIG. 1, in respective operating configurations.
Figure 3:
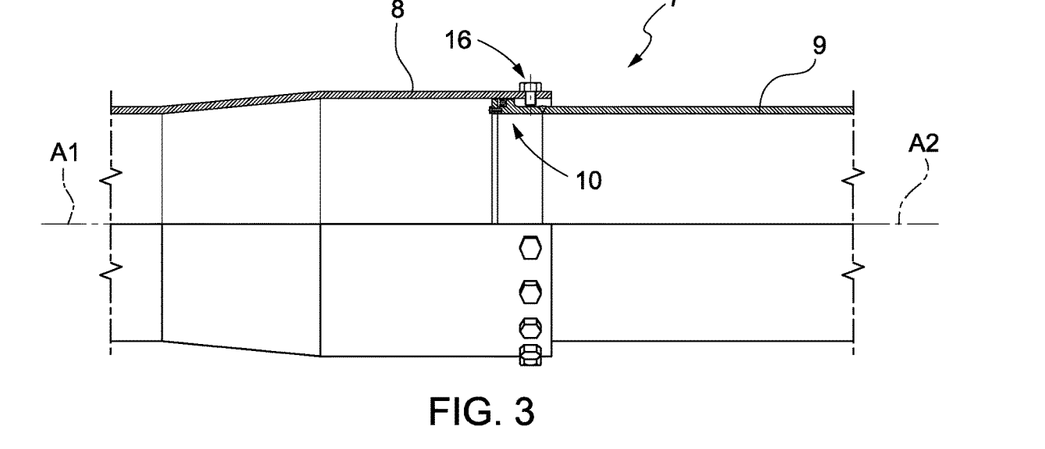
Figure 4:
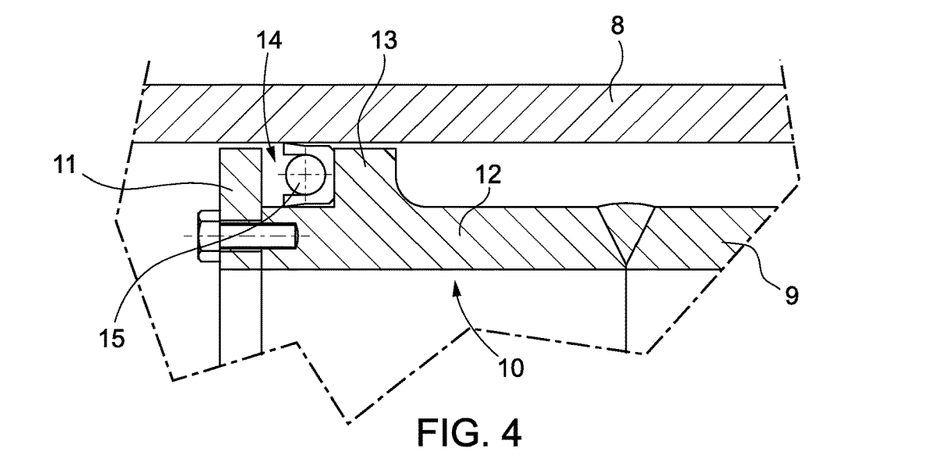
FIG. 4 is a section view of the detail IV of FIG. 2.

With reference to FIGS. 2, 3, and 4, the telescopic joint 7 comprises a pipe section 8 extending along an axis A1 and having a diameter D1, and a pipe section 9 extending along an axis A2 and having a diameter D2 smaller than the diameter D1.

The pipe section 9 is arranged at least partly within the pipe section 8 and is slidingly coupled to the pipe section 8 so that axis A1 and axis A2 are substantially coincident.

The pipe sections 8 and 9 are made of the same material, in particular a metallic material, such as stainless steel.

The telescopic joint 7 comprises an end assembly 10 welded to one end of the pipe section 9.

With reference to FIG. 4, the end assembly 10 comprises an annular wall 11 and a ring 12, which has a first end fixed by welding to the pipe section 9 and a second end fixed by fasteners to the annular wall 11.

The ring 12 is made of the same material as the pipe sections 8 and 9.

The first end of the ring 12 has the same diameter as the diameter D2 of the pipe section 9, therefore the ring 12 constitutes the extension of the pipe section 9.

The central portion of the ring 12 comprises a shoulder 13, which has a face facing the annular wall 11 and bounds an annular seat 14 together with the annular wall 11, the cylindrical face of the ring 12 included between the annular wall 11 and the shoulder 13, and the cylindrical face of the pipe section 8.

The second end of the ring 12 has a threaded hole for coupling to the annular wall 11 by a fastener, such as a screw.

The telescopic joint 7 further comprises an annular gasket 15, which is housed within the annular seat 14 and comprises a polymeric casing with a U-shaped section, and a helical spring housed within the polymeric casing.

The polymeric casing comprises an annular face abutted against the shoulder 13, and two cylindrical lips integral with the annular face which are in contact with the cylindrical face of the ring 12 comprised between the annular wall 11 and the shoulder 13, and the cylindrical face of the pipe section 8, respectively. In this configuration, the pressurized cryogenic fluid inside the annular seat causes the lips to expand against the cylindrical face of the ring 12 comprised between the annular wall 11 and the shoulder 13, and the cylindrical face of the pipe section 8. As such, the tightness increases as the pressure of the cryogenic fluid increases.

The faces of the annular seat 14, which are in contact with the annular gasket 15, have a surface roughness of less than 0.9 μm, in particular less than 0.3 μm.

In particular, the face of the shoulder 13 facing the annular wall 11, the external cylindrical face of the ring 12 comprised between the annular wall 11 and the shoulder 13, and the internal cylindrical face of the pipe section 8 are machined by precision turning in order to obtain a surface roughness of less than 0.9 μm, in particular less than 0.3 μm. In this way, the annular gasket 15, which is housed in the annular seat 14 with the preloaded spring, can adhere to the face of the shoulder 13 facing the annular wall 11, to the external cylindrical face of the ring 12 comprised between the annular wall 11 and the shoulder 13, and to the internal cylindrical face of the pipe section 8.

With reference to FIGS. 2 and 3, the telescopic joint 7 comprises a stroke block 16 releasably fixed to a portion of the pipe section 8 arranged around the pipe section 9.

According to a variant of the first embodiment (not shown), the stroke block 16 comprises at least one screw screwed inside a respective threaded hole, passing through the thickness of the pipe section 8.

In particular, as shown in FIGS. 2 and 3, the stroke block 16 comprises a plurality of screws screwed inside threaded holes, passing through the thickness of the pipe section 8. In this configuration, the stroke block 16 ensures that the pipe sections 8 and 9 are substantially coaxial.

Figure 5:
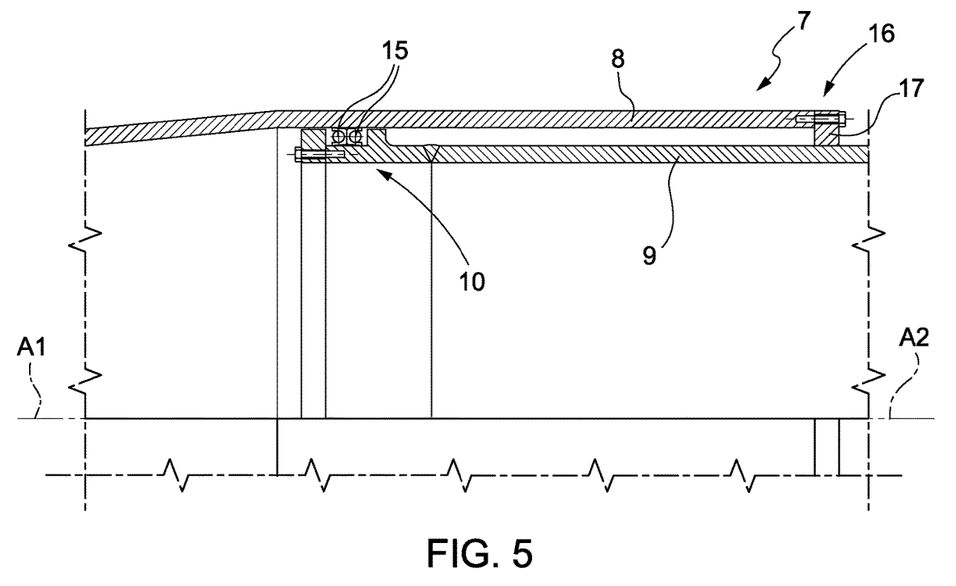
FIG. 5 is a side elevation view, with parts removed for clarity and parts in section, of a variant of the joint in accordance with the embodiment of FIGS. 2 and 3.

With reference to FIG. 5, in accordance with a variant of the present disclosure, the stroke block 16 comprises at least one seal ring 17 fixed in a releasable manner, such as by a plurality of screws, to one end of the pipe section 8 arranged around the pipe section 9.

In addition, inside the annular seat 14 there are two annular gaskets 15 arranged with the annular faces of the polymeric casing contacting each other.

In the configuration of FIG. 2, the positions of the pipe sections 8 and 9 relative to one another are different from the positions of the pipe sections 8 and 9 relative to one another in the configuration of FIG. 3.

In particular, the drop in temperature causes the pipe sections 8, 9 and the pipeline 4 to contract, resulting in telescopic sliding of the pipe section 9 relative to the pipe section 8.

Moreover, when the cryogenic fluid flows in the pipeline 4, the pressure of the cryogenic fluid pushes the annular gasket 15 in abutment against the shoulder 13, thus increasing the tightness of the annular gasket 15.

Figure 6:
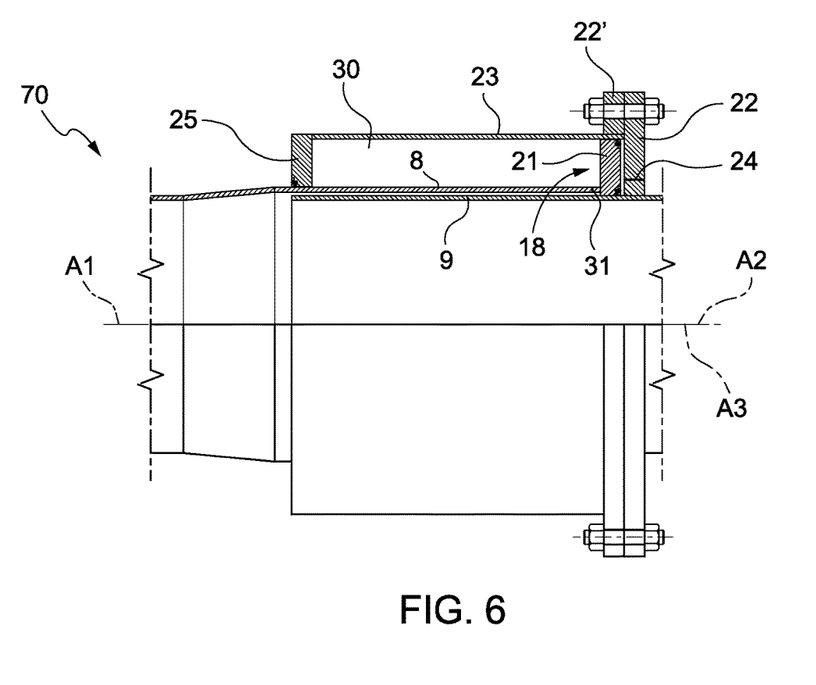
FIGS. 6 and 7 are side elevation views, with parts removed for clarity and parts in section, of a pipeline joint of the transfer system of FIG. 1, in accordance with a second embodiment of the present disclosure, in respective operating configurations.
Figure 7:
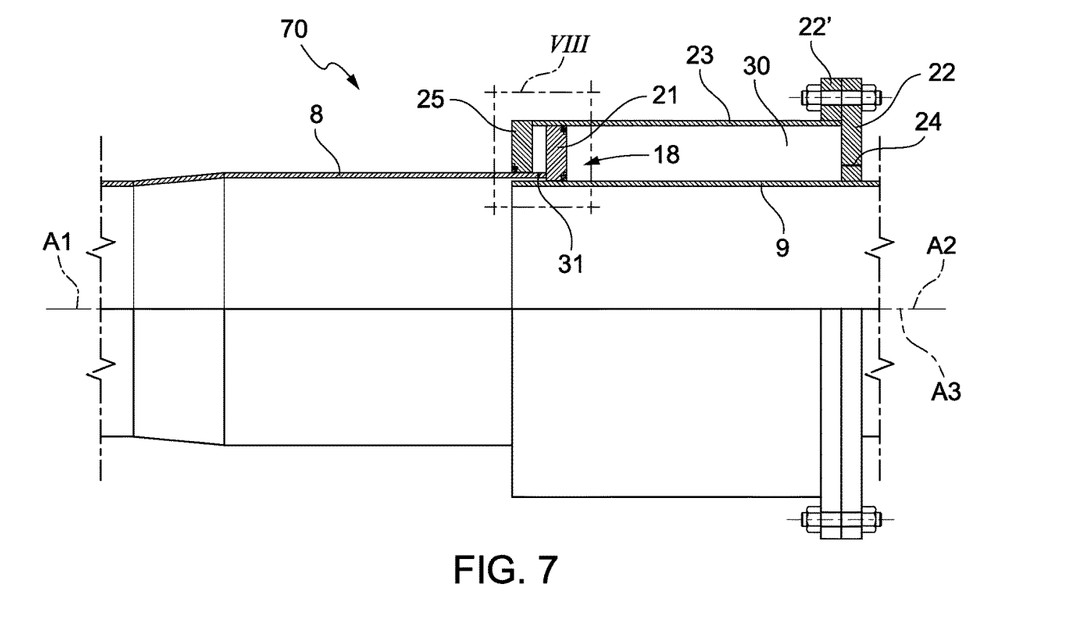
Figure 8:
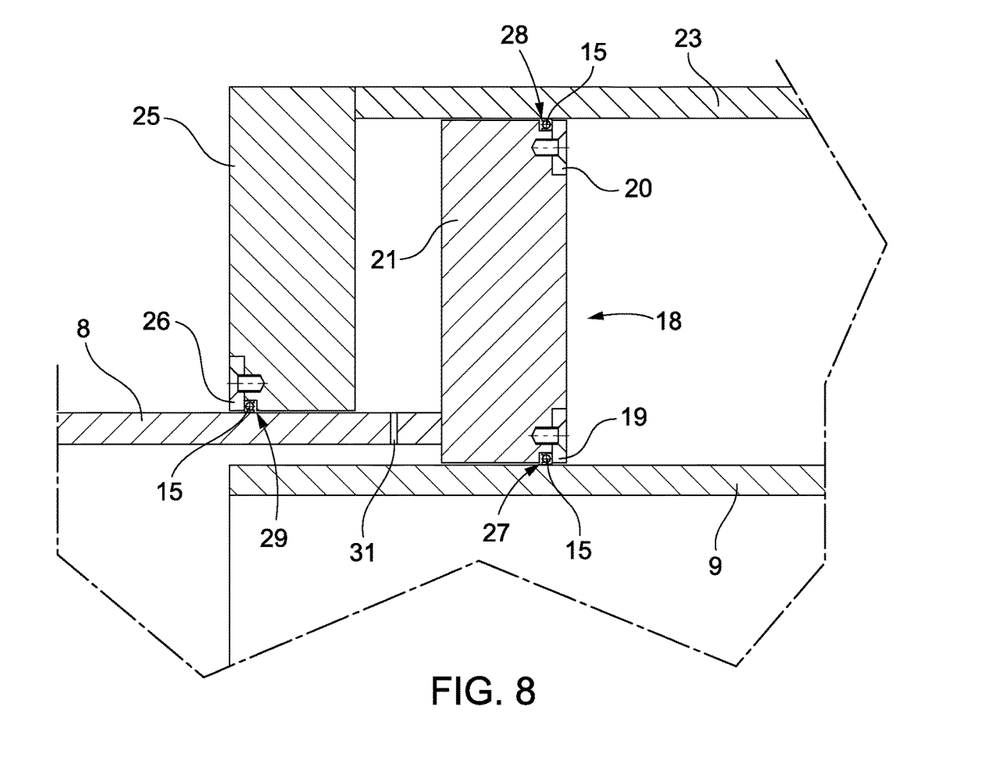
FIG. 8 is a sectional view of the detail VIII of FIG. 7.

FIGS. 6, 7 and 8 show a telescopic joint 70, which is made according to a second embodiment of the disclosure and comprises a single pipe section 9 and an end assembly 18 fixed, by welding, to one end of the pipe section 8.

The end assembly 18 comprises an annular wall 19, an annular wall 20 and a ring 21, which has a first end fixed by welding to the pipe section 8 and a second end fixed by fasteners to the annular wall 19 and the annular wall 20 (FIG. 8).

The telescopic joint 70 comprises an annular support 22 and a pipe section 23, extending along an axis A3 and having a diameter D3. The pipe section is arranged around the pipe sections 8 and 9 and is fixed to the pipe section 9 by a flange 22', which is coupled by fasteners to the annular support 22.

The annular support 22 consists of a ring fixed to the external wall of the pipe section 9 and comprises at least one hole 24 passing through the thickness of the annular support 22 to enable the passage of air through the annular support 22.

According to a variant of the second embodiment, the annular support 22 comprises a plurality of holes 24 passing through the thickness of the annular support 22.

In particular, the plurality of holes 24 enables air to be vented from the interspace comprised between the pipe sections 9 and 23 and laterally bounded by the ring 21 and the annular support 22 to prevent an excessive increase in pressure inside the interspace during the expansion of the pipe sections 8, 9 and 23. In addition, the plurality of holes 24 enable the air to enter the interspace to prevent an excessive decrease in pressure inside the interspace during the contraction of the pipe sections 8, 9 and 23.

Furthermore, the telescopic joint 70 comprises a stroke block 25 consisting of a ring arranged around the pipe section 8 and fixed to the pipe section 23.

With reference to FIG. 8, an annular wall 26 is fixed in a releasable manner to one end of the stroke block 25 by fasteners.

In greater detail, the telescopic joint 70 comprises three annular seats 27, 28 and 29.

The annular seat 27 is bounded by the external cylindrical face of the pipe section 9, by the ring 21 and by the annular wall 19.

The annular seat 28 is bounded by the internal cylindrical face of the pipe section 23, by the ring 21 and by the annular wall 20.

The annular seat 29 is bounded by the external cylindrical face of the pipe section 8, by the stroke block 25 and by the annular wall 26.

At least one annular gasket 15 is housed in each of the annular seats 27, 28 and 29.

The faces of the annular seats 27, 28 and 29 which are in contact with the annular gasket 15 have a surface roughness of less than 0.9 μm, in particular less than 0.3 μm.

In this configuration, the pipe section 23, together with the pipe section 9, the stroke block 25 and the annular support 22, bounds an annular region 30 inside which the ring 21 can slide during the expansion and contraction of the pipeline 4 (FIG. 1).

Furthermore, the pipe section 8 comprises at least one through-hole 31, the axis of which intersects the pipe section 23 in all operating conditions.

According to a variant of the second embodiment, the pipe section 8 comprises a plurality of through-holes 31, the axes of which intersect the pipe section 23 in all operating conditions.

The holes 31 pass through the thickness of the pipe section 8 to enable the cryogenic fluid to flow inside the cylindrical crown bounded by the stroke block 25, the ring 21, the external cylindrical face of the pipe section 8 and the internal cylindrical face of the pipe section 23.

In addition, the diameters D2 and D3 are sized so that the area of the face of the ring 21 facing the stroke block 25 and the area of the cross-section of the pipe section 9 are substantially the same. In greater detail, the square of the diameter D3 is substantially equal to twice the square of the diameter D2. In other words, the diameter D2 and the diameter D3 are related by the relation:

$$D3^2=2*D2^2$$

In this configuration, the forces of the pressurized cryogenic fluid which are discharged onto the axial supports of the pipeline 4, are substantially zero, enabling the supports to be movable along the direction of extension of the pipeline 4.

Figure 9:
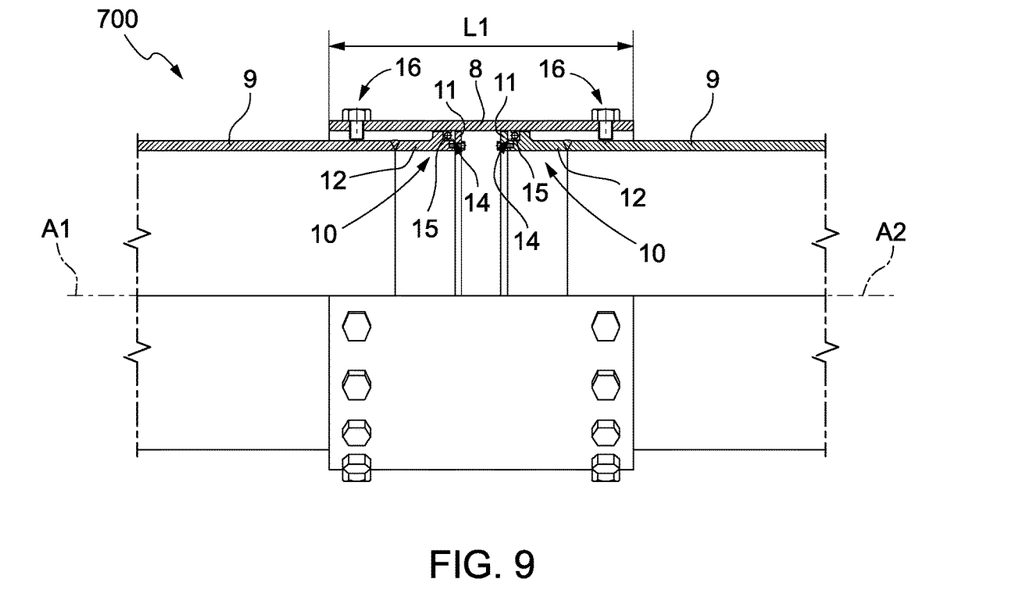
FIGS. 9 and 10 are side elevation views, with parts removed for clarity and parts in section, of a pipeline joint of the transfer system of FIG. 1, in accordance with a third embodiment of the present disclosure, in respective operating configurations.
Figure 10:
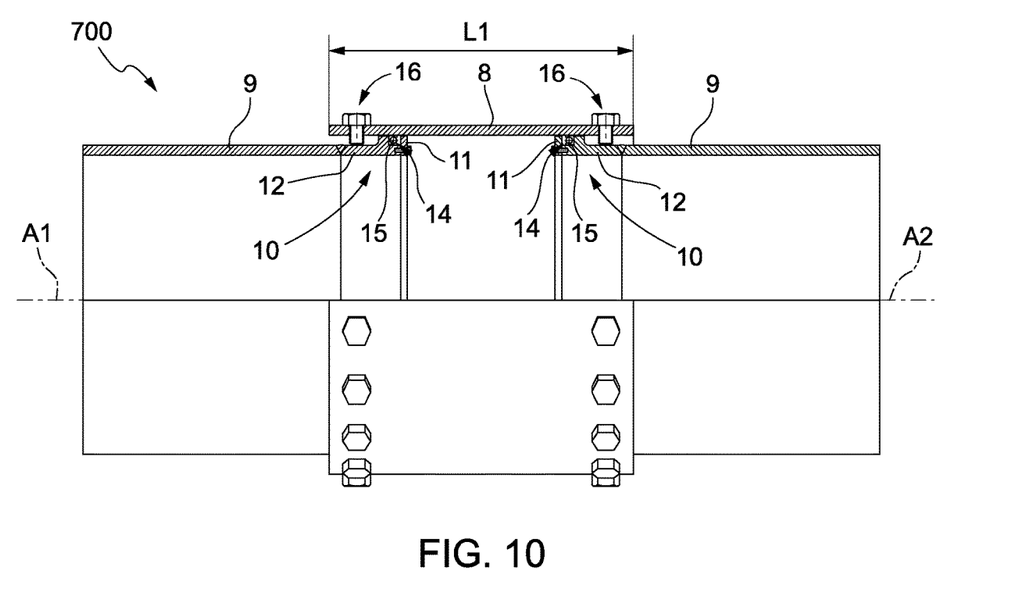

FIGS. 9 and 10 show a telescopic joint 700, which is made in accordance with a third embodiment of the disclosure and comprises a pipe section 8 with an axis A1; two pipe sections 9 with an axis A2; and two end assemblies 10, each of which is integral with a respective pipe section 9 and is configured as described in the first embodiment, as shown in FIGS. 2 to 4.

In particular, each end assembly 10 comprises an annular wall 11 and a ring 12, which has a first end fixed by welding to the respective pipe section 9 and a second end fixed by fasteners to the annular wall 11. The pipe section 8 extends in the longitudinal direction over a longitudinal length L 1, whereas the pipe sections 9 and the two end assemblies 10 extend in directions opposite to each other.

The pipe sections 9 have a diameter D2 smaller than the diameter D1 of the pipe section 8, are arranged at least partly within the pipe section 8, and are slidingly coupled to the pipe section 8 so that the axis A1 and the axes A2 are substantially coincident. In this configuration, the telescopic joint 700 comprises two annular gaskets 15, each of which is housed in a respective annular seat 14 of the respective end assembly 10.

The telescopic joint 700 comprises two stroke blocks 16, each of which is fixed in a releasable manner to one of the two portions of the pipe section 8 arranged around the respective pipe section 9.

With reference to FIG. 9, the telescopic joint 700 is shown, in which the pipe sections 9 are relatively close to each other.

With reference to FIG. 10, the telescopic joint 700 is shown, in which the pipe sections 9 are more spaced apart from one another than in FIG. 9.

Figure 11:
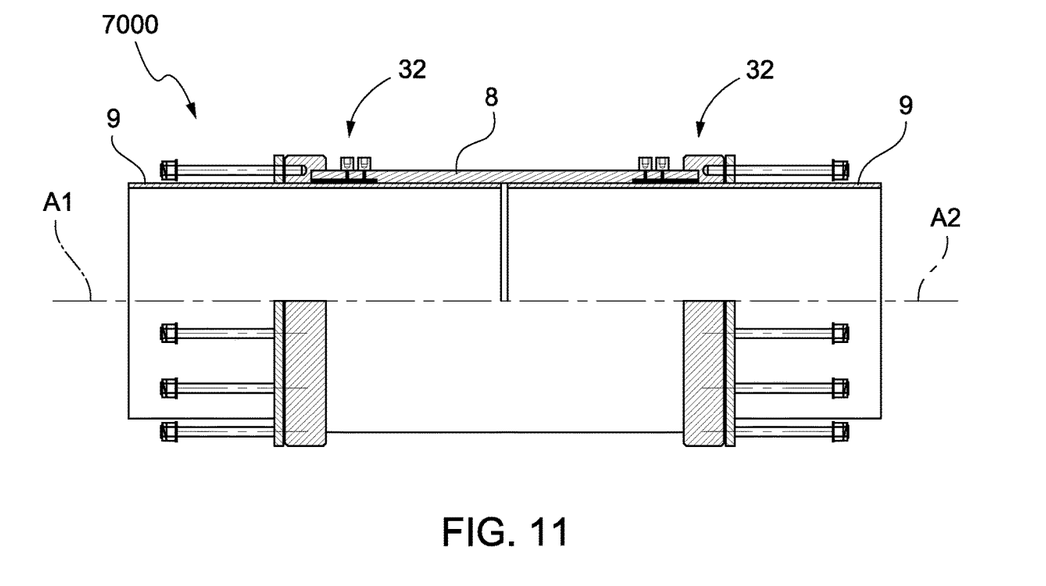
FIGS. 11 and 12 are side elevation views, with parts removed for clarity and parts in section, of the pipeline joint of the transfer system of FIG. 1, in accordance with a fourth embodiment of the present disclosure, in respective operating configurations.
Figure 12:
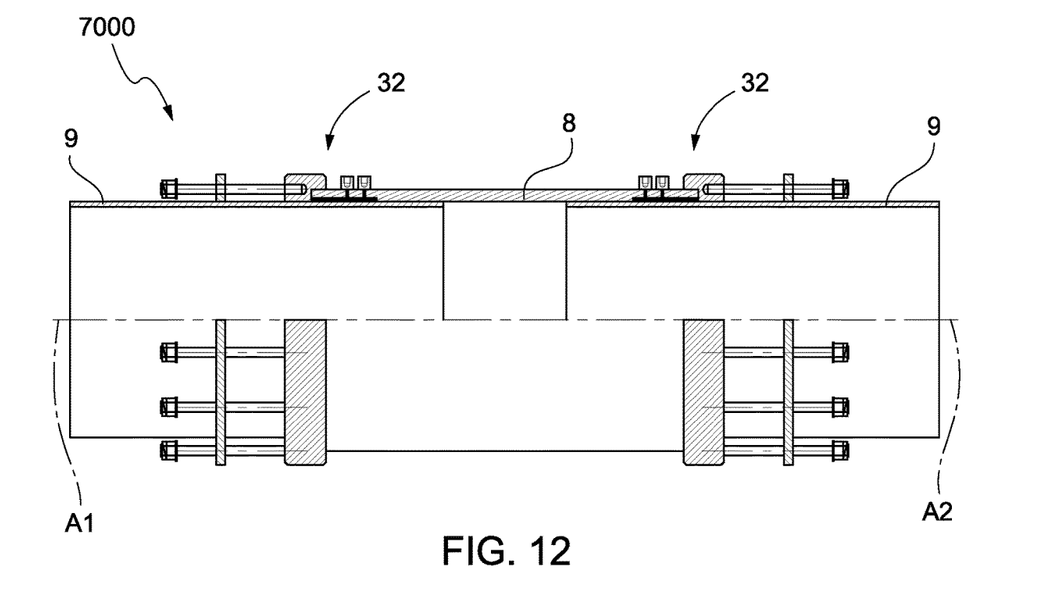
Figure 13:
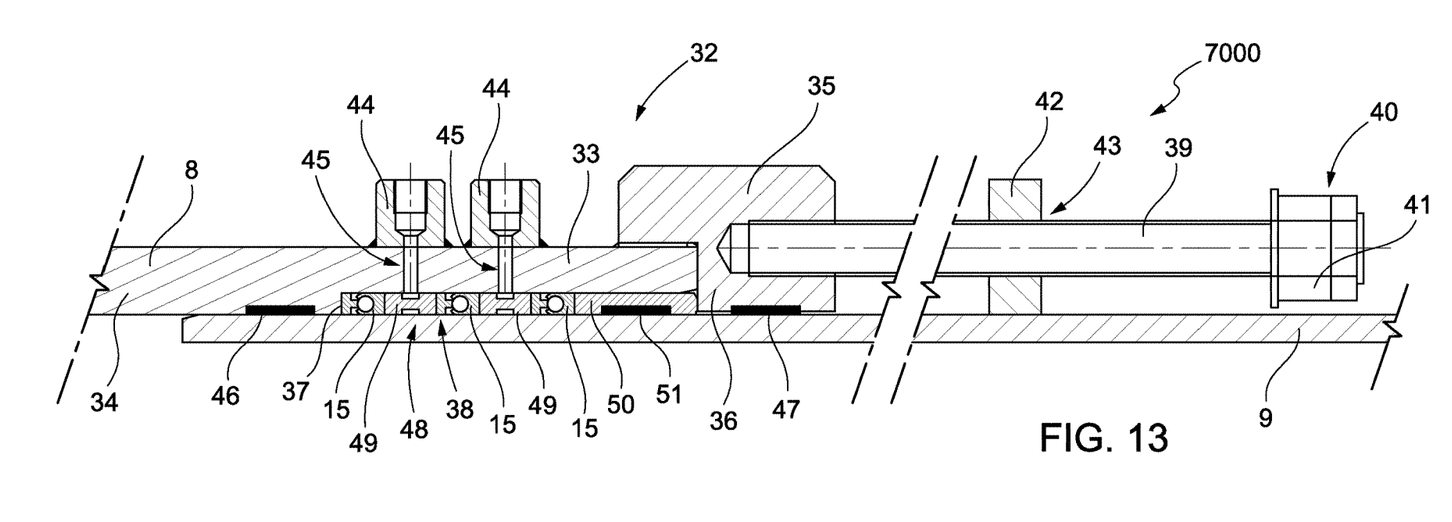
FIG. 13 is a section view of the detail XII of FIG. 11.

FIGS. 11, 12 and 13 show a telescopic joint 7000, which is made in accordance with a fourth embodiment of the disclosure and comprises a pipe section 8 with an axis A1; two pipe sections 9 with an axis A2; and two end assemblies 32, each of which is integral with a respective end of the pipe section 8.

With reference to FIG. 13, each end assembly 32 comprises a ring 33 having a thickness less than the central portion 34 of the pipe section 8; and an annular element 35, which is releasably fixed to the ring 33 and comprises an annular wall 36.

In accordance with one embodiment, the ring 33 constitutes the extension of the central portion 34.

In accordance with a further embodiment (not shown), the ring 33 is fixed by welding to the central portion 34.

In particular, the annular element 35 is screwed to the ring 33.

In greater detail, the ring 33 comprises a shoulder 37, which has an annular face facing the annular wall 36 and bounds an annular seat 38 together with the internal cylindrical face of the ring 33, the external cylindrical face of the pipe section 9, and the annular wall 36.

Furthermore, each end assembly 32 comprises a plurality of tie rods 39 fixed at a first end to the annular element 35 and extending along an axis substantially parallel to the axes A1 and A2 (FIGS. 11 and 12).

Each tie rod 39 is provided with a stroke block 40 fixed to a second end of the tie rod 39. In particular, the stroke block 40 comprises a nut 41 screwed to the second end of the respective tie rod 39.

The telescopic joint 7000 further comprises two rings 42 (only one of which is visible in FIG. 13), which are fixed to the external cylindrical faces of the respective pipe sections 9, at a distance from the pipe section 8, and are provided with through-openings 43, in each of which the respective tie rod 39 is inserted in a slidable manner. In particular, each ring 42 is interposed between the respective annular element 35 and each stroke block 40 so as to limit the sliding of the respective pipe section 9 relative to the pipe section 8.

Furthermore, each end assembly 32 comprises at least one sleeve 44 fixed to the external cylindrical surface of the ring 33, at a respective through-opening 45 in the ring 33, so as to enable the installation of a pressure gauge (not shown) configured to measure the pressure within the annular seat 38.

Moreover, the telescopic joint 7000 comprises a guide 46, inserted in a respective seat obtained in the pipe section 8, and two guides 47 (only one of which is visible in FIG. 13), inserted in respective seats obtained in each annular element 35.

The telescopic joint 7000 comprises two sealing assemblies 48, each of which is housed in the respective annular seat 38 and comprises at least one annular gasket 15.

In the case described and illustrated herein, not intended to limit the present disclosure, each sealing assembly 48 comprises three annular gaskets 15; two spacers 49, each of which is arranged between two annular gaskets 15; and a ring 50, which is arranged between one of the annular gaskets 15 and the annular wall 36 and has a housing seat for a gasket 51.

In particular, each spacer 49 is arranged at the respective through-opening 45.

With reference to FIG. 11, the telescopic joint 7000 is shown, in which the pipe sections 9 are relatively close to each other.

With reference to FIG. 12, the telescopic joint 7000 is shown, in which the pipe sections 9 are more spaced apart from one another than in FIG. 11.

Figure 14:
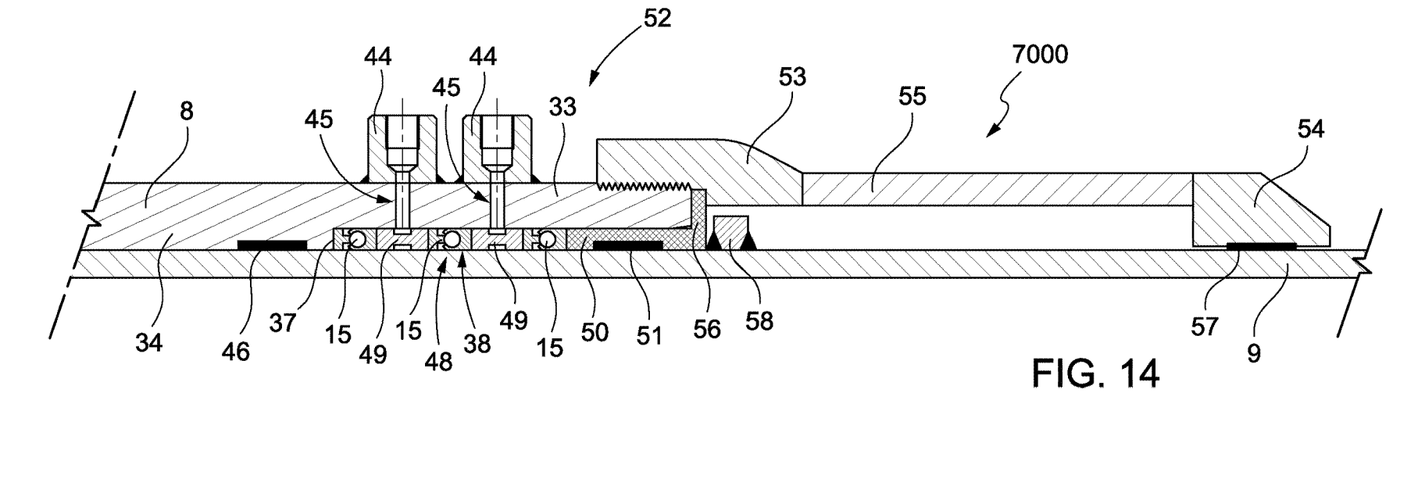
FIG. 14 is a section view of a detail of a variant of the joint in accordance with the embodiment of FIGS. 11 and 12.

FIG. 14 shows the telescopic joint 7000, which is made in accordance with a variant of the fourth embodiment of the disclosure. In this configuration, the telescopic joint 7000 has an end assembly 52 comprising an annular element 53 screwed to the ring 33; a stroke block 54; and a pipe section 55, which is arranged around the respective pipe section 9 and is fixed to the annular element 53 at one end and to the stroke block 54 at the other end.

In the case described and illustrated herein, the ring 50 comprises an annular wall 56 held by the annular element 53 in contact with one end of the pipe section 8.

Furthermore, the telescopic joint 7000 comprises two guides 57 (only one of which is visible in FIG. 14), each of which is housed in a seat obtained in the respective stroke block 54 and is configured to guide the sliding of the respective pipe section 9 relative to the stroke block 54; and two rings 58, each of which is fixed to the respective pipe section 9, such as by welding, and is configured to limit the sliding of the respective pipe section 9 relative to the pipe section 8.

It is clear that the present disclosure can be subject to variations without however departing from the scope of protection of the appended claims, and that it finds application in the transport of any fluid inside pipelines that are subject to temperature changes. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A pipeline telescopic joint configured to compensate for pipeline dimensional changes, the pipeline telescopic joint comprising:
   a first pipe section having a first diameter;
   a second pipe section having a second diameter smaller than the first diameter, the second pipe section arranged at least partly within the first pipe section and slidingly coupled to the first pipe section;
   an end assembly fixed to the second pipe section, wherein:
      the end assembly and the first pipe section define an annular seat, and
      the end assembly comprises:
         a ring welded to the second pipe section, wherein the ring comprises a shoulder which has a face facing the annular wall and which bounds the annular seat together with the annular wall and the facing cylindrical faces of the ring and of the first pipe section, and
         an annular wall releasably fixed to one end of the ring to bound the annular seat together with a cylindrical face of the ring facing a cylindrical face of one of the first pipe section and the second pipe section; and
      an annular gasket housed within the annular seat and comprising a polymeric casing and a spring housed within the polymeric casing, wherein the polymeric casing is in contact with the facing cylindrical faces.

2. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to one of the first pipe section and the second pipe section, wherein:
  - the end assembly and the other one of the first pipe section and the second pipe section define an annular seat, and
  - the end assembly comprises:
    - a ring welded to the one of the first pipe section and the second pipe section, and
    - an annular wall releasably fixed to one end of the ring to bound the annular seat together with a cylindrical face of the ring facing a cylindrical face of one of the first pipe section and the second pipe section;
- an annular gasket housed within the annular seat and comprising a polymeric casing and a spring housed within the polymeric casing, wherein the polymeric casing is in contact with the facing cylindrical faces; and
- a stroke block releasably fixed to a portion of the first pipe section arranged around the second pipe section.

3. The pipeline telescopic joint of claim 2, wherein the stroke block comprises a fastener passing through a thickness of the first pipe section.

4. The pipeline telescopic joint of claim 2, wherein the stroke block comprises a seal ring releasably fixed to one end of the first pipe section arranged around the second pipe section.

5. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to one of the first pipe section and the second pipe section, wherein:
  - the end assembly and the other one of the first pipe section and the second pipe section define an annular seat, and
  - the end assembly comprises:
    - a ring welded to the one of the first pipe section and the second pipe section, and
    - an annular wall releasably fixed to one end of the ring to bound the annular seat together with a cylindrical face of the ring facing a cylindrical face of one of the first pipe section and the second pipe section;
- an annular gasket housed within the annular seat and comprising a polymeric casing and a spring housed within the polymeric casing, wherein the polymeric casing is in contact with the facing cylindrical faces; and
- an annular support and a third pipe section fixed to the second pipe section by the annular support, the third pipe section having a third diameter greater than the first diameter of the first pipe section, wherein the end assembly is fixed to the first pipe section and comprises a first annular wall which bounds a first annular seat together with the ring and the cylindrical face of the second pipe section, and a second annular wall which bounds a second annular seat together with the ring and a cylindrical face of the third pipe section.

6. The pipeline telescopic joint of claim 5, wherein the annular support defines a first through-hole.

7. The pipeline telescopic joint of claim 5, further comprising a stroke block fixed to the third pipe section and arranged around the first pipe section.

8. The pipeline telescopic joint of claim 7, wherein the stroke block comprises a third annular wall releasably fixed to an end portion of the stroke block, the third annular wall bounding a third annular seat together with the end portion of the stroke block and the cylindrical face of the first pipe section.

9. The pipeline telescopic joint of claim 8, wherein the first pipe section defines a second through-hole, an axis of the second through-hole intersecting the third pipe section.

10. The pipeline telescopic joint of claim 9, wherein a square of the third diameter is substantially equal to twice a square of the second diameter.

11. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to one of the first pipe section and the second pipe section, wherein:
  - the end assembly and the other one of the first pipe section and the second pipe section define an annular seat, and
  - the end assembly comprises:
    - a ring welded to the one of the first pipe section and the second pipe section, and
    - an annular wall releasably fixed to one end of the ring to bound the annular seat together with a cylindrical face of the ring facing a cylindrical face of one of the first pipe section and the second pipe section;
- an annular gasket housed within the annular seat and comprising a polymeric casing and a spring housed within the polymeric casing, wherein the polymeric casing is in contact with the facing cylindrical faces; and
- two second pipe sections and two end assemblies, wherein the first pipe section extends in a longitudinal direction over a length, and the two second pipe sections and the two end assemblies extend in directions opposite to each other.

12. The pipeline telescopic joint of claim 11, further comprising two stroke blocks, wherein a first stroke block of the two stroke blocks is releasably fixed to a first portion of the first pipe section arranged around a first second pipe section of the two second pipe sections, and a second stroke block of the two stroke blocks is releasably fixed to a second portion of the first pipe section arranged around a second second pipe section of the two second pipe sections.

13. The pipeline telescopic joint of claim 12, wherein each of the two stroke blocks comprises a fastener passing through a thickness of the first pipe section.

14. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to the first pipe section, wherein: the end assembly and the second pipe section define an annular seat, and
  the end assembly comprises:
    - a ring welded to the first pipe section, wherein the ring defines a through-opening to enable pressure inside the annular seat to be measured,
    - an annular wall releasably fixed to one end of the ring to bound the annular seat together with a cylindrical face of the ring facing a cylindrical face of one of the first pipe section and the second pipe section, and
    - an annular element releasably fixed to the ring bounding the annular seat together with an external cylindrical face of the second pipe section and the annular wall; and
- an annular gasket housed within the annular seat and comprising a polymeric casing and a spring housed within the polymeric casing, wherein the polymeric casing is in contact with the facing cylindrical faces.

15. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to the first pipe section, wherein: the end assembly and the second pipe section define an annular seat, and
  the end assembly comprises:
    - a ring welded to the first pipe section,
    - an annular wall releasably fixed to one end of the ring to bound the annular seat together with a cylindrical face of the ring facing a cylindrical face of one of the first pipe section and the second pipe section,
    - an annular element releasably fixed to the ring bounding the annular seat together with an external cylindrical face of the second pipe section and the annular wall, and
    - a plurality of tie rods, each tie rod is fixed to the annular element and is associated with a stroke block, the ring being fixed to the second pipe section defining a plurality of through-openings in which the plurality of tie rods are slidingly inserted to limit the sliding of the second pipe section relative to the first pipe section; and
- an annular gasket housed within the annular seat and comprising a polymeric casing and a spring housed within the polymeric casing, wherein the polymeric casing is in contact with the facing cylindrical faces.

16. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to the first pipe section, wherein: the end assembly and the second pipe section define an annular seat, and
  the end assembly comprises:
    - a ring welded to the first pipe section,
    - an annular wall releasably fixed to one end of the ring to bound the annular seat together with a cylindrical face of the ring facing a cylindrical face of one of the first pipe section and the second pipe section, and
    - an annular element releasably fixed to the ring bounding the annular seat together with an external cylindrical face of the second pipe section and the annular wall;
- an annular gasket housed within the annular seat and comprising a polymeric casing and a spring housed within the polymeric casing, wherein the polymeric casing is in contact with the facing cylindrical faces; and
- two second pipe sections and two end assemblies, wherein the two second pipe sections and the two end assemblies extend in directions opposite to each other.

17. A pipeline telescopic joint configured to compensate for pipeline dimensional changes, the pipeline telescopic joint comprising:
- a first pipe section having a first diameter;
- a second pipe section having a second diameter smaller than the first diameter, the second pipe section arranged at least partly within the first pipe section and slidingly coupled to the first pipe section;
- an end assembly fixed to the first pipe section, wherein: the end assembly and the second pipe section define an annular seat, and
  the end assembly comprises:
    - a ring welded to the first pipe section,
    - an annular wall releasably fixed to one end of the ring to bound the annular seat together with a cylindrical face of the ring facing a cylindrical face of one of the first pipe section and the second pipe section,
    - an annular element screwed to the ring,
    - a stroke block, and
    - a third pipe section arranged around the second pipe section and fixed to the annular element and the stroke block; and
- an annular gasket housed within the annular seat and comprising a polymeric casing and a spring housed within the polymeric casing, wherein the polymeric casing is in contact with the facing cylindrical faces.

18. The pipeline telescopic joint of claim 17, further comprising a sealing assembly housed in the annular seat and comprising an annular gasket and a ring defining an annular wall held by the annular element in contact with one end of the first pipe section.

* * * * *